July 8, 1969 J. LIEBERMANN 3,454,732
HUMIDITY CONTROL APPARATUS
Filed April 19, 1967
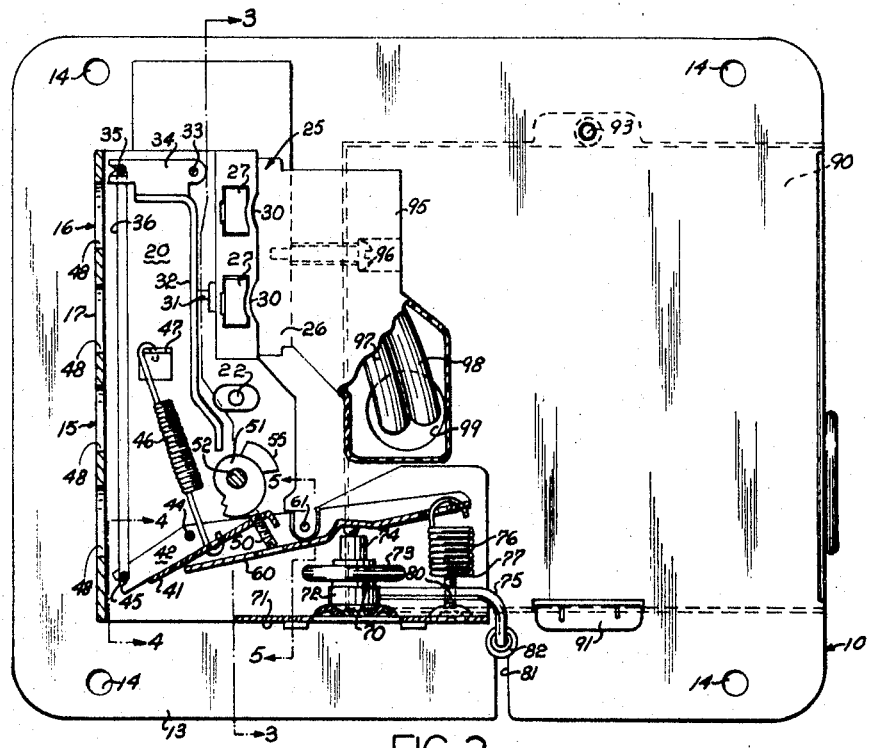
FIG.2
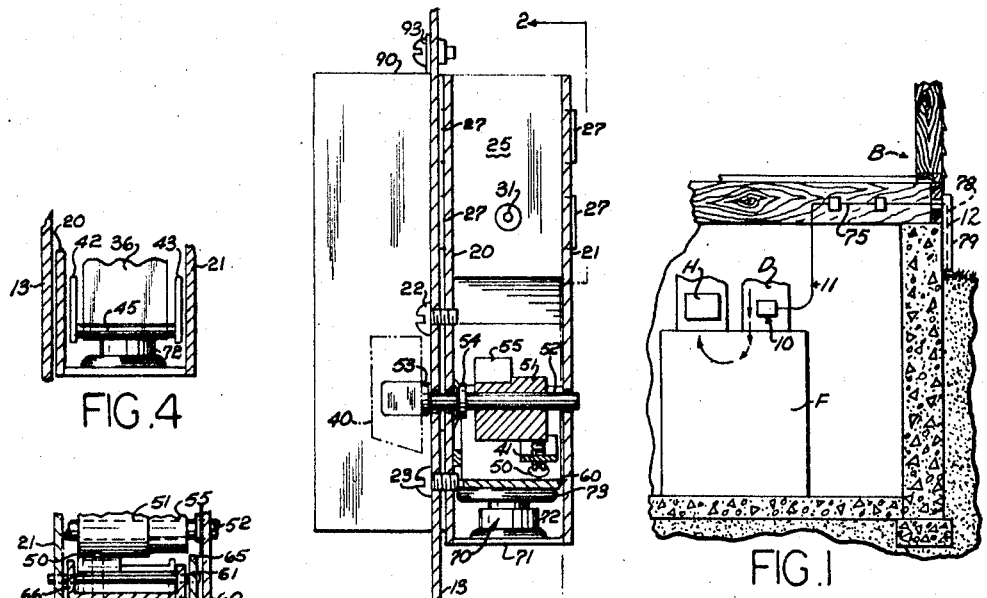
FIG.4
FIG.5
FIG.3
FIG.1
INVENTOR.
JOHN LIEBERMANN
BY
ATTORNEYS

United States Patent Office 3,454,732
Patented July 8, 1969

3,454,732
HUMIDITY CONTROL APPARATUS
John Liebermann, Columbus, Ohio, assignor to Ranco Incorporated, Columbus, Ohio, a corporation of Ohio
Filed Apr. 19, 1967, Ser. No. 631,942
Int. Cl. H01h 35/42
U.S. Cl. 200—61.06                           7 Claims

ABSTRACT OF THE DISCLOSURE

An apparatus controls operation of a humidifying unit (not shown) in a heating system for a building. The apparatus is installed in an air return duct of the system and responds to the humidity of the heated air and to the outside air temperature to actuate the humidifying unit. The apparatus comprises a switch having a normally outwardly positioned operating plunger which is depressed by a lever to close the switch. The lever is moved by a band of hygroscopic material which changes length by an increase or decrease in moisture. The effective length of the band is altered by a lever to which the band is attached. The lever is shiftable about its pivot by rotation of a manually positionable cam or by a temperature responsive diaphragm which acts on the lever through a lever. The diaphragm has a capillary tube connected therewith and the diaphragm and tube are filled with a vapor. The tube is led to the outside of the building so that at relatively low outside temperatures, the diaphragm shifts the lever to thereby cause a decrease in the length of the band to actuate the switch.

---

The present invention relates to control apparatus for humidifying units which units are operative to introduce moisture into the air heating systems of buildings or other spaces and thereby maintains an optimum level of humidity for the comfort of occupants of the buildings.

The provision of means for humidifying the air in buildings is particularly desirable in cold weather because the humidity of the atmospheric air is generally relatively low and further, the heating of the air tends to reduce the relative humidity thereof. Humidifying units are frequently installed in air heating equipment for buildings and their operation is controlled by apparatus responsive to the humidity of the air in the building to be heated by the equipment. It has been found that when the temperature of the atmosphere is relatively low, the relative humidity of the air inside the building should be correspondingly reduced to prevent excessive condensation of moisture onto windows, walls, etc. To meet this situation, it has been proposed heretofore to provide control apparatus for humidifying units, which apparatus is responsive to outside air temperature to lower the humidity from that for which the apparatus is set to provide. These apparatuses have been expensive and difficult to install.

Accordingly, the principal object of the present invention is the provision of a control apparatus for humidifying units of the type mentioned, which apparatus is responsive to the humidity of air in the building which the humidifying unit serves and is also responsive to atmospheric or outside air temperatures to modify the control functions of the apparatus so as to maintain a lower relative humidity in the air inside the building as the outside air temperature is lowered, and which apparatus is relatively simple to manufacture and install in the heating systems of buildings and the like.

Another object of the invention is the provision of a humidity control apparatus of the character described in which a moisture sensitive member is arranged to operate a control switch by elongation and contraction thereof and the effective length of which member can be selectively changed by a manual control mechanism to vary the humidity range of operation of the switch, and which mechanism includes a part shiftable by a thermally responsive element in accordance with temperatures outside the building to modify adjustment of the moisture sensitive member. In a preferred form of the invention the thermally responsive element is ineffective above a given temperature to further modify the adjustment of the apparatus.

A further object of the invention is the provision of a humidity control apparatus of the character mentioned which can be conveniently installed in an air heating system for a building or the like and which has a temperature responsive element comprising a capillary tube which can be threaded through a relatively small opening in the wall of the building and subjected to outside air and which is effective to modify the responsiveness of the apparatus to the humidity of the air as effected by the humidifying unit.

Other objects and advantages of the invention will become apparent from the following detailed description thereof, reference being made to the accompanying drawings in which:

FIG. 1 is a schematic, sectional view of a portion of a building having a heating system in which a control apparatus embodying the invention is installed;

FIG. 2 is a sectional view of the control apparatus for a humidifying unit in the heating system, the view being taken substantially along line 2—2 of FIG. 3;

FIG. 3 is a sectional view taken substantially along line 3—3 of FIG. 2;

FIG. 4 is a sectional view taken substantially along line 4—4 of FIG. 2; and

FIG. 5 is a sectional view taken substantially along line 5—5 of FIG. 2.

Referring to the drawings, a building B is shown having rooms which are adapted to be heated by air directed thereto through a duct system D leading from a hot air furnace F, or the like, and which furnace includes an electrically operated humidifying unit H which discharges water into the air passing through the duct after it has been heated by the furnace. The operation of the humidifying unit is regulated by a control apparatus 10, which embodies the invention. The furnace F, humidifying unit H and duct system D may be of conventional construction and are not shown in detail because they are not essential to the understanding of the invention. The apparatus 10 is preferably installed with certain parts thereof supported inside the return air duct D and upstream from the furnace F and humidifying unit H so as to respond to the humidity of the air returned from the heated rooms of the building. The control apparatus 10 includes a temperature responsive element 11, a portion 12 of which is disposed on the exterior of the building so as to respond to outside air temperatures and which modifies operation of the control apparatus as appears hereinafter.

The control apparatus 10 comprises a rectangular mounting plate 13 which has openings 14 at the corners thereof by which the plate is bolted to the exterior of the wall of the air duct D and over an opening in the wall so that the humidity sensitive portion of the control apparatus extends into the duct and is subjected to air passing through the duct. The plate 13 forms a closure for the opening in the duct wall.

The humidity responsive portion of the control apparatus 10 is shown generally at 15 and it comprises an L-shaped frame 16, preferably formed of a sheet metal channel member having a yoke wall 17 and two side walls 20, 21. The side wall 20 is secured to the plate 13 by screws 22, 23.

A control device comprising an electric toggle switch mechanism 25 is supported at the upper end of the frame 16, as viewed in the drawings, by and between the side walls 20, 21 and is adapted to be connected in series circuit with the humidifying unit to initiate operation of the unit in response to low relative humidity conditions and to terminate operation of the unit in response to a relatively higher humidity. The toggle switch of the mechanism 25 is enclosed in a housing 26 formed of a suitable molded insulation having two pairs of rectangular bosses 27 on opposite sides thereof which project through rectangular openings in the side walls 20, 21 of the frame so as to firmly position the switch housing in the frame. Preferably, the narrow portions of the walls 20, 21 along one side of the openings are deformed inwardly as at 30 to firmly grip the bosses 27. The switch mechanism 25 includes a switch operating member in the form of a plunger 31 which is normally biased outwardly of the housing 26 and which is engaged by an arm 32 pivoted on a pin 33 supported in opposite openings in the frame side walls 20, 21. The switch 25 is normally open and when the plunger 31 is depressed to a certain point, the switch snaps to its circuit closing position.

The arm 32 is preferably formed of a metal stamping and includes two flanges 34, only one of which appears in the drawings, on opposite sides of the arm and having openings for receiving the pin 33 therethrough. The flanges 34 also support the ends of a pin 35 which extends parallel to the pin 33 and about which a moisture sensitive band 36 is looped. The opposite end of the band 36 is supported by means described hereinafter. The band 36 is preferably formed of nylon which tends to elongate when the relative humidity of the air to which it is subjected increases and to contract as the relative humidity of the air decreases. A band of any other suitable material could be employed which responds to humidity changes similarly to nylon. When the band 36 contracts, it tends to swing arm 32 counterclockwise and depress the plunger 31 to close the switch and initiate operation of the humidifying unit and, as the band relaxes and elongates, the arm 32 swings clockwise and permits the plunger 31 to move outwardly and the switch opens to terminate operation of the humidifying unit.

The degree of humidity at which the switch 25 is operated can be adjusted by a knob 40, the adjustment of which knob is effective to shift the support pin 45 for the lower end of the band 36 relative to the pin 35 and thereby cause a change in the length of the band which is effective to actuate the switch 25. The longer the band 36, the higher will be the range of moisture content of the air. The adjusting mechanism comprises a channel-shaped lever 41 having two opposed side flanges 42, 43 which are pivoted to a pin 44 supported in openings through the opposite sides 20, 21 of the frame 16. A pin 45 is secured at opposite ends in slots in the end edges of the flanges 42, 43, and one end of the band 36 is looped about the pin.

The lever 41 is biased upwardly, as viewed in FIG. 2, and is urged counterclockwise about the pin 44 by a tension spring 46, the upper end of which is hooked to a tab 47 formed from the metal of the side 20, and the opposite end of the spring is hooked through openings through the lever 41, as shown.

It will be noted that the band 36 extends along the wall 17 of the frame, and that wall has openings 48 therein to permit air to pass to the band. Furthermore, the upper and lower ends of the frame 16 are open to permit free flow of air about the band 36.

The end of the lever 41, opposite the end to which the band 36 is attached, is provided with a screw 50 threaded therein which engages the periphery of a cam 51 which is attached to a shaft 52 journaled in openings through the sides 20, 21 of the frame and which shaft extends through an opening in the plate 13. The end of the shaft 52 projecting through the plate 13, receives the knob 40 which is suitably attached thereto. The shaft 52 is retained in position by annular flanges 53, 54 located on the inner side of plate 20 and the outer side of plate 13, as shown in FIG. 3. It will be seen that by rotating the cam 51 in one direction or the other the lever 41 will be swung to cause a decrease or increase in the space between the pins 35 and 45 so as to require a corresponding change in the length of the band 36, as a function of a change in humidity, in order to actuate the switch 25.

The switch 25 can be selectively retained opened or closed, irrespective of humidity conditions, by rotation of the knob 40 to one extremity of its range of movement or the other. For this purpose, the cam 51 is provided with a lug 55, one edge of which is adapted to engage the lower end of the arm 32 when the knob 40 is turned to one extremity of its movement and retain the arm in the switch open position irrespective of changes in humidity conditions, and the opposite end of the lug is adapted to engage the lever 32 when the cam is rotated to the other extremity of its rotation to maintain the switch plunger 31 depressed and close the switch 25 irrespective of changes in humidity.

The humidity control structure described thus far is somewhat similar to that shown in U.S. patent to Harris, No. 3,091,674.

It is desirable to adjust the responsiveness of the humidity responsive band 36 in accordance with the prevailing outside air temperature, and for this purpose a lever 60 is provided which is pivoted on a pin 61 supported at its ends in openings through opposed walls 20, 21 of the frame.

The lever 60 is channel-shaped, having two opposed walls 65, 66 through which the pin 61 extends and which walls carry the pin 44 to which the lever 41 is pivoted. It will be seen that the pin 44 is at one extremity of the lever 60 and as the lever 60 is rotated about its pivot 61, the pin 44 will be moved generally longitudinally of the band 36, thereby changing the spacing between the pins 35, 45 and the degree to which the band 36 must expand or contract to operate the switch 25.

The position of the lever 60 about its pivot 61 is regulated by a thermally responsive element 70 which expands and contracts according to changes of outside temperature. The thermal element 70 comprises a cylindrical base 72 which is attached to a boss formed on the frame wall 71 and on which an expansible diaphragm 73 is secured. The diaphragm 73 is preferably of well-known construction and is comprised of two flexible dish-shaped metallic discs joined together about their peripheral edges thereof in a manner to form a flat closed chamber therebetween, the walls of which move from one another in response to fluid pressure increases in the chamber. The outer side of the upper disc of the diaphragm 73 has an abutment 74 integral therewith which engages a dimple on the lever 60, and the lever, being urged to the abutment by a spring described hereinafter, moves about its pivot in response to expansion and contraction of the diaphragm. The interior of the diaphragm 73 is in communication with a capillary tube 75, one end of which is brazed in a bore, not shown, in the base 72 leading to the interior of the diaphragm, and the opposite end of the capillary tube is sealed. Both the diaphragm 73 and tube 75 contain a vapor which is adapted to be partially condensed at the temperatures and pressures to which the vapor within the power element is subjected during normal operating conditions. The vapor may be a suitable refrigerant, such as a Freon type.

Preferably, the diaphragm 73 and tube 75 contain a limited amount of vaporizable material so that the fluid is completely vaporized at 40° to 45° F., for example. Thus, when the outside temperature rises above 40° F. or 45° F., the diaphragm will not be further expanded to an appreciable degree.

The lever 60 is urged to the abutment 74 by a tension spring 76, one end of the spring being hooked through an opening in one end of the lever 60 and the opposite end of the spring being threaded on a nut 77. The nut 77 is in turn threaded on a screw 80 rotatably supported in an opening in the frame wall 71, and the screw can be rotated to adjust the tension of the spring 76.

The portion of the capillary tube 75 adjacent the diaphragm 73 passes through a slot 81 in the plate 13, and a grommet 82 is interposed between the walls of the slot and the tube to prevent undue wear or cutting of the tube by the sides of the slot. The capillary tube 75 may be of any suitable length, such as 10 or 12 feet, and is adapted to be extended through an opening in the wall of the building and to have an end section 78 subjected to the outside air. Preferably, the section 78 of the tube 75 and hereinbefore referred to as the portion 12 of the temperature responsive element 11 is enclosed by a perforated shield 79 attached to the outside of the building wall. However, the tube could be placed in a fresh air inlet duct into the building, for example, so as to be subjected to the temperature of the outside air. It will be understood by those familiar with the art that the pressure within the diaphragm 73 will correspond to the vapor pressure of the gas enclosed in the thermal element at the lowest temperature of any portion of the element. During cold weather, the lowest temperature to which the element is normally subjected is at the outer end of the tube 75 inasmuch as the interior of the building will be warm and the diaphragm 73 will be subjected to the heated air passing through the duct to which it is exposed while the outside air will usually be well below 70° F.

As a convenience in effecting electrical connection of the switch 25 in the circuit of the humidifying unit, the side of the plate 13 which is on the outside of the duct D has a suitable junction box 90 attached thereto by a lip 91 thereon extending through a slot in the plate and by a screw 93 threaded into the plate. Preferably, a housing 95 of molded insulation, or the like, is attached to the terminal portion of the switch housing 26 by a screw 96, and wires 97, 98 connected to the switch terminals, are enclosed in the housing and extend through an opening 99 in plate 13, which opening is in registration with the interior of the junction box 90. Provision is made inside the junction box, not shown, for quickly and efficiently connecting the wires 97, 98 with the wires leading to the power source and to the humidifying unit.

It will be seen that when the control apparatus 10 is installed as described, and the outside temperature commences to fall below about 45° F., the pressure of spring 76 on the diaphragm 73 causes the diaphragm to tend to collapse and thereby move the pin 44 upwardly, causing the lever 41, pivotally carried on the lever 60 by the pin, to pivot clockwise about the point of engagement of the screw 50 with the cam 51. This tends to move the pin 45 upwardly and cause the band 36 to actuate switch 25 to the off position with less elongation than was formerly required to actuate the switch. Thus, a lower range of humidity of the air will cause actuation of the switch 25. Conversely, when the diaphragm 73 expands due to an increase in outside air temperature, below about 45° F., the lever 60 is moved counterclockwise about its pivot 61 which lowers the pivot pin 44 for the lever 41, thereby moving the pin 45 in a downward direction. This movement tends to cause the band 36 to move the switch 25 to its closed position, and a higher humidity in the air is required to cause elongation of the band to open the switch. Thus, the switch 25 is caused to be operated in a higher humidity range than at lower outside temperatures. When the outside temperature is above about 45° F. but below the temperature to be maintained in the room, the element 70 is ineffective to increase the humidity demands of the apparatus, thereby providing a more desirable humidity regulation.

The range of humidity at which the switch 25 is operated is also adjustable manually by rotation of the knob 40 which causes the cam 51 to turn and thereby shift the lever 41 about its pivot 44 and adjust the effective length of the band 36 which changes the range of the humidity at which the band is effective to operate the switch in the same manner as described with reference to shifting of the lever 60 by the thermal element 70.

It is apparent that the present invention provides a durable, accurate and relatively inexpensive humidity control apparatus which is adjustable by the user and which also responds to humidity conditions of air to which it is subjected as well as to temperature conditions remote from the apparatus. The apparatus can be readily installed in existing equipment with a minimum of alteration or special construction of the equipment and building in which it is installed.

Although but one form of the invention has been disclosed, other forms, modifications, and adaptations thereof may be made.

I claim:

1. In a control apparatus responsive to humidity conditions, a frame, a control device supported on said frame and including a movable operating member, means for actuating said operating member comprising an elongated member which elongates and contracts in accordance with the increases and decreases in the relative humidity in air surrounding said elongated member and having one part attached to said operating member, a first lever supporting another part of said elongated member, a second lever pivotally supported on said frame and pivotally supporting said first lever on a swinging portion of said second lever, manually settable means to form a shiftable pivot for said first lever, and temperature responsive means supported on said frame and moving said second lever about its pivot in response to changes in temperature.

2. In a control apparatus as defined in claim 1 in which said manually settable means comprises a manually rotatable cam supported on said frame and engaged by said first lever.

3. In a control apparatus as defined in claim 1 in which said temperature responsive means comprises a vapor filled diaphragm and capillary tube connected with said diaphragm, said tube adapted to extend remote from said frame.

4. In a control apparatus as defined in claim 2 in which said frame comprises a plate and an L-shaped channel member supported on one side of said plate, said plate adapted to be secured to a wall and extending over an opening in the wall into which said channel member extends, said control device comprising a switch supported between the walls of said channel member and adjacent one end thereof, said switch including an operating plunger extending between the side walls of said channel member, a switch actuating lever pivoted between the sides of said channel member at said one end thererof and having a free end thereof extending generally towards the central portion of said L-shaped frame and adapted to engage and actuate said plunger, said second lever being pivoted between the side walls of said channel member and extending in a direction transversely of the direction, said actuating lever extends and being spaced from said free end of said actuating lever, said first lever having a first portion extending along a portion of said second lever, said means responsive to changes in moisture comprising a band of material which elongates and shrinks in response to increases and decreases in moisture content thereof, one end of said band attached to said actuating lever adjacent the pivot thereof and the other end of said band attached to the end of said second portion of said first lever remote from said second lever, said temperature responsive means comprising an expansible element supported on the yoke wall of said channel member and engaging said second lever, spring means attached to said second lever and to said yoke wall for urging said second lever to said temperature responsive means, and said temperature responsive means comprising means having an expansible chamber and a closed capillary tube in connection therewith and containing a vapor adapted to condense at atmospheric temperatures, said capillary tube adapted to be extended an appreciable distance from said plate.

5. A control apparatus as defined in claim 3 in which said diaphragm and capillary tube contain a fluid which is completely vaporized at temperatures above 45° F.

6. A control apparatus as defined in claim 4 in which said fluid is partially vaporized at temperatures below 40° to 45° F.

7. A control apparatus as defined in claim 2 and including a screw threaded in an opening through said first lever and riding on the sloping surface of said cam.

References Cited
UNITED STATES PATENTS

| | | | |
|---|---|---|---|
| 3,115,557 | 12/1963 | Kjellman | 200—61.06 |
| 3,143,610 | 8/1964 | Gustafson | 200—61.06 |
| 3,163,729 | 12/1964 | Flagg | 200—61.06 XR |

HERMAN O. JONES, *Primary Examiner.*